United States Patent
Bodkin et al.

(10) Patent No.: US 7,684,681 B1
(45) Date of Patent: Mar. 23, 2010

(54) RECEIVERS FOR TELEVISION SIGNALS

(75) Inventors: Nigel Bodkin, Isleworth (GB); Xavier Willame, Isleworth (GB); Robin Crossley, Isleworth (GB); Nick James, Isleworth (GB)

(73) Assignee: British Sky Broadcasting Limited, Isleworth, Middlesex (GB)

( * ) Notice: Subject to any disclaimer, the term of this patent is extended or adjusted under 35 U.S.C. 154(b) by 1642 days.

(21) Appl. No.: 10/049,042

(22) PCT Filed: Aug. 9, 2000

(86) PCT No.: PCT/GB00/03065

§ 371 (c)(1),
(2), (4) Date: May 30, 2002

(87) PCT Pub. No.: WO01/11865

PCT Pub. Date: Feb. 15, 2001

(30) Foreign Application Priority Data

Aug. 9, 1999 (GB) .................................. 9918772.6
Jan. 20, 2000 (GB) .................................. 0001326.8

(51) Int. Cl.
*H04N 7/26* (2006.01)
(52) U.S. Cl. .............................. 386/124; 386/46; 386/83
(58) Field of Classification Search .................. 386/46, 386/83, 124–126; 725/14–21, 33–35, 60–66; 348/565, 567
See application file for complete search history.

(56) References Cited

U.S. PATENT DOCUMENTS 4,319,286 A    3/1982   Hanpachern (Continued)

FOREIGN PATENT DOCUMENTS

DE    4204689 A    8/1993

(Continued)

OTHER PUBLICATIONS

Statement of Grounds & Particulars of Opposition, Australian Patent Application No. 2004237900, Jan. 2009, pp. 1-24.

*Primary Examiner*—Thai Tran
*Assistant Examiner*—Mishawn Dunn
(74) *Attorney, Agent, or Firm*—Rothwell, Figg, Ernst & Manbeck, PC

(57) ABSTRACT

A Hard Disk Recorder (HDR) (3) is arranged to receive signals signals defining television programmes and television programme schedule data. The HDR receives updated programme schedule data substantially constantly in a dedicated programme schedule data channel. The HDR is arranged to output the programme schedule data for display on a television screen (2). The HDR comprises a hard disk (16) for recording received television programmes. A remote control (28) is provided to select television programmes to be recorded from the displayed programme schedule. Furthermore, the HDR is arranged to receive additional programme schedule information included in each of the received television channels which information is used to control the hard disk to record pre-programmed television programmes according to schedule. The hard disk is operable to record simultaneously two different television programmes received in different channels. Also, the HDR is operable to replay a currently broadcast programme offset in time. The time offset can be overcome by playing back the part of the programme inside the time offset at an increased frame rate. Furthermore, the HDR is arranged to receive transition signals indicating transitions between parts of programmes, such as transitions between advertisements and the "actual" programmes. The HDR is operable to use these transition signals, for example, to skip between transitions in previously recorded programmes replayed from the hard disk.

5 Claims, 7 Drawing Sheets

U.S. PATENT DOCUMENTS

| | | | |
|---|---|---|---|
| 4,520,404 A | 5/1985 | Von Kohorn | |
| 4,602,297 A | 7/1986 | Reese | |
| 4,605,964 A | 8/1986 | Chard | |
| 4,605,973 A | 8/1986 | Von Kohorn | |
| 4,750,052 A | 6/1988 | Poppy et al. | |
| 4,750,213 A | 6/1988 | Novak | |
| 4,888,796 A | 12/1989 | Olivo, Jr. | |
| 4,930,158 A | 5/1990 | Vogel | |
| 4,930,160 A | 5/1990 | Vogel | |
| 4,974,085 A | 11/1990 | Campbell et al. | |
| 5,253,066 A | 10/1993 | Vogel | |
| 5,333,091 A | 7/1994 | Iggulden et al. | |
| 5,359,367 A | 10/1994 | Stockill | |
| 5,371,551 A | 12/1994 | Logan et al. | |
| 5,387,942 A | 2/1995 | Lemelson | |
| 5,446,488 A | 8/1995 | Vogel | |
| 5,485,219 A | 1/1996 | Woo | |
| 5,572,332 A | 11/1996 | Shin | |
| 5,659,653 A | 8/1997 | Diehl et al. | |
| 5,668,917 A | 9/1997 | Lewine | |
| 5,696,866 A | 12/1997 | Iggulden et al. | |
| 5,754,253 A * | 5/1998 | Lee | 348/565 |
| 5,774,170 A | 6/1998 | Hite et al. | |
| 5,774,186 A | 6/1998 | Brodsky et al. | |
| 5,828,402 A | 10/1998 | Collings | |
| 5,852,474 A | 12/1998 | Nakagaki et al. | |
| 5,880,768 A | 3/1999 | Lemmons et al. | |
| 6,018,612 A * | 1/2000 | Thomason et al. | 386/82 |
| 6,240,244 B1 * | 5/2001 | Ikeda | 386/125 |
| 6,430,363 B2 * | 8/2002 | Sasaki et al. | 386/112 |
| 6,542,203 B1 * | 4/2003 | Shadwell et al. | 348/726 |
| 6,678,227 B1 * | 1/2004 | Kondo et al. | 369/47.33 |
| 2003/0149988 A1 | 8/2003 | Ellis et al. | |

FOREIGN PATENT DOCUMENTS

| | | |
|---|---|---|
| DE | 4205762 A | 8/1993 |
| DE | 4408131 A | 7/1995 |
| DE | 19648965 A1 | 10/1997 |
| EP | 0 784 401 A2 | 7/1997 |
| EP | 0 785 675 A2 | 7/1997 |
| EP | 0789 488 A2 | 8/1997 |
| EP | 0 940 985 A2 | 9/1999 |
| JP | 1060165 A | 3/1989 |
| JP | 2037567 A | 2/1990 |
| JP | 4100388 A | 4/1992 |
| JP | 6086220 A | 3/1994 |
| JP | 6342056 A | 12/1994 |
| JP | 07030839 | 1/1995 |
| JP | 08279976 | 10/1996 |
| JP | 10243307 A | 9/1998 |
| JP | 11185317 A | 7/1999 |
| JP | 11196374 | 7/1999 |
| WO | WO 81/00945 A1 | 4/1981 |
| WO | 8300971 A1 | 3/1983 |
| WO | WO 92/22983 * | 12/1992 |
| WO | 9304473 A2 | 3/1993 |
| WO | 9427404 A1 | 11/1994 |
| WO | WO 96/31980 A1 | 10/1996 |
| WO | WO 98/26584 A1 | 6/1998 |
| WO | WO 99/06719 A1 | 2/1999 |
| WO | WO 99/22513 A2 | 5/1999 |
| WO | WO 99/33265 A1 | 7/1999 |
| WO | WO 99/66719 A1 | 12/1999 |
| WO | WO 01/22729 A1 | 3/2001 |

* cited by examiner

RECEIVERS FOR TELEVISION SIGNALS

CROSS REFERENCE TO RELATED APPLICATIONS

The present application is a national stage filing under 35 U.S.C. § 371 of International Application No. PCT/GB00/03065, filed 9 Aug. 2000, and claims priority under 35 U.S.C. §119 to Great Britain patent application No. 9918772, filed 9 Aug. 1999 and Great Britain patent application No. 0001326.8, filed 20 Jan. 2000.

The inventions relates to improvements in receivers for television signals.

BACKGROUND OF THE INVENTION

A Hard Disk Recorder (HDR) is known which comprises a television receiver and a hard disk for recording received television programmes. The HDR is arranged to be connected to the telephone network in order to receive through the telephone network television programme schedule information for display on a television screen. A telephone link must be established with the provider of the programme schedule data every time the programme schedule data is to be updated. Such updating may be performed at regular intervals, say once a day. The programme schedule data may be used by a user to program the HDR in order to record a desired television programme.

The requirement to establish a link with the HDR via a telephone network is undesirable. This is because the HDR may not always "on line" for reasons such as costs, or because the telephone connection is to be used otherwise. Accordingly, the available programme schedule data may be out of date. If a user relies on the programme schedule information when programming his HDR to record a desired programme, he may unknowingly rely on out-of-date programme schedule data, which in turn may result in the desired programme not being recorded.

Also, due to the ever increasing variety of television channels and programmes, it is getting more likely that there will be a clash in the programme schedule of television programmes which the user would wish to record. Currently known video cassette recorders (VCRs) and HDRs fail to address this problem.

An HDR is also known which allows the recording of a broadcast television programme, while simultaneously replaying the same television programme offset in time. This is useful, for example, when a viewer misses the start of his favourite programme by a few minutes but nevertheless does not wish to wait until the programme has been recorded completely before he can start playing back the recorded programme. However, in the case of live programmes such as live sport events, the knowledge that the "real" live event is running exerts a strong emotional pull. At present, the user has the choice of catching up with the live broadcast simply by switching to the live broadcast, thereby ignoring the missed period, or by watching the programme offset in time.

In addition, some parts of a recorded television programme may not be of interest to the viewer. For example, the viewer may not be interested in advertisements. Users of VCRs who not interested in advertisement breaks, for example during a movie, respond to this simply by fast-forwarding during the advertisements. Also, when watching a series of recorded video clips, the user may not be interested in some of the clips but can only jump forward to the next clip of interest by fast-forwarding the video tape. This clearly is inconvenient. To record parts of programmes in which the viewer is not interested, in any case, is a waste of hard disk storage capacity.

Advertisements broadcast during interruptions of a television programme are generally geared to appeal to the potential viewers of the television programme. Since this is not a very exact science, it may be that in certain environments the broadcast advertisements do not appeal to the viewers at all, or do at least not use the full potential of the advertisement breaks. The prior art has not addressed this problem.

Accordingly, it is desirable to at least address these and other problems of the prior art.

SUMMARY OF THE INVENTION

According to one aspect of the invention, there is provided a receiver for receiving signals representative of television programmes in a plurality of channels, the receiver comprising: a first tuner for receiving signals in a first channel; a second tuner for simultaneously receiving signals in a second channel; and a recorder for recording data representative of signals in the first and the second channel received simultaneously by the first tuner and the second tuner.

According to another aspect of the invention, there is provided a receiver for receiving signals in a plurality of channels, the signals being representative of television programmes and programme schedule data which defines events in terms of channels, programmes and broadcast times, the receiver comprising: a decoder for separating the signals representative of the television programmes from the signals representative of the programme schedule data; a recorder for recording data representative of the television programmes; means for producing output signals defining an image of events in the programme schedule for displaying on a television screen, which schedule is in accordance with the received signals representative of the programme scheduling data; and a user operable selector operable to select events identified in the image of events and responding to such user selection to cause the recorder to record data representative of the television programmes corresponding to the selected events.

According to another aspect of the invention there is provided a receiver for receiving signals representative of a television programme, and for outputting simultaneously a signal representative of the television programme shifted in time, the receiver comprising a recorder for recording data representative of the television programme, and for playing back data representative of the time-shifted television programme, wherein the receiver is operable to output signals representative of the television programme at an increased frame rate so as to reduce the time shift.

Preferably, the receiver may comprise a first data buffer for buffering data representative of the television programme to be recorded by the recorder; a second data buffer for buffering data being played back from the recorder; and a processor for selectively causing data to be transferred from the first data buffer to the recorder at a first data rate or from the recorder to the second data buffer at a second data rate, wherein the second data rate is higher than the first data rate to cause the receiver to output signals representative of the television programme at the increased frame rate so as to reduce the time shift. The first data rate is in accordance with the bandwidth of received signals, and the second data rate is in accordance with a user-selected frame rate.

According to another aspect of the invention there is provided a receiver for receiving signals in a plurality of channels, the signals comprising television signals representative of a television programme, and information signals indicative of a predetermined portion of the television programme, the receiver comprising: a decoder circuit for generating control signals responsive to receipt of the information signals; and a recorder for receiving the control signals, and for recording data representative of the received television signals, the recorder being responsive to the control signals to interrupt recording of data representative of the received television signals during reception of television signals representative of the predetermined portion of the television programme.

The information signal may comprise a first information signal representative of the start of the predetermined portion of the television programme, and a second information signal representative of the end of the predetermined portion, wherein the decoder is arranged to generate a first control signal in response to the first information signal, and a second control signal in response to the second information signal, and the recorder is arranged to interrupt the recording of data representative of received television signals responsive to the first control signal, and to resume the recording of data representative of received television signals responsive to the second control signal.

Alternatively, the information signals and the control signals may be indicative of the duration of the predetermined portion of the television programme, wherein the recorder is arranged to respond to one of the control signals by interrupting the recording of data representative of received television signals for the duration indicated by the one control signal.

According to another aspect of the invention there is provided a receiver for receiving signals in a plurality of channels, the signals comprising television signals representative of a television programme, and information signals indicative of a predetermined portion of the television programme, the receiver comprising: a decoder circuit for generating control signals responsive to receipt of the information signals; a storage medium for storing video data for display on a television screen; and output means for receiving the control signals, and for outputting selectively for display on a television screen received television signals or video signals representative of the video data from the storage medium, the output means being responsive to the control signals to output the video signals during reception of television signals representative of the predetermined portion of the television programme.

The information signal may comprise a first information signal representative of the start of the predetermined portion of the television programme, and a second information signal representative of the end of the predetermined portion, the decoder is arranged to generate a first control signal in response to the first information signal, and a second control signal in response to the second information signal, and the output means is arranged to output the video signals in response to the first control signal, and to output the television signals in response to the second control signal.

Alternatively, the information signals and the control signals may be indicative of the duration of the predetermined portion of the television programme, wherein the output means is arranged to respond to one of the control signals by outputting the video signals for the duration indicated by the one control signal.

According to another aspect of the invention there is provided a receiver for receiving signals in a plurality of channels, the signals comprising television signals representative of a television programme, and information signals indicative of the start and/or the end of a predetermined portions of the television programme, the receiver further comprising: a recorder for recording data representative of received signals, and for playing back recorded data for display on a screen of the television programme represented thereby; and user operable control means operable to cause the recorder to detect recorded data representative of the information signals to skip to the start and/or end of the predetermined portion of the television programme during playback of the recorded data.

In the foregoing the recorder may comprise a hard disk or an optical storage medium and the storage medium may comprise a hard disk or a CD.

BRIEF DESCRIPTION OF THE DRAWINGS

An embodiment of the invention will now be described, by way of example only, with reference to the accompanying drawings, in which.

DETAILED DESCRIPTION OF AN EMBODIMENT OF THE INVENTION

1. System Overview

Figure 1:
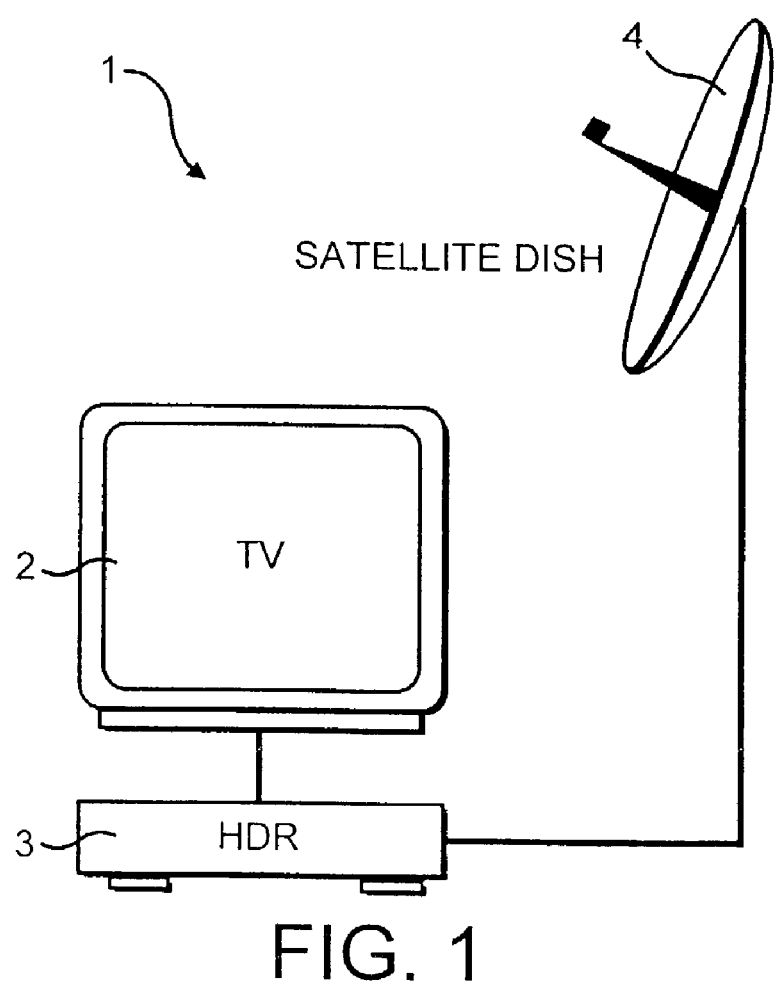
FIG. 1 is a schematic diagram of a television receiver system.

Referring now to FIG. 1 of the accompanying drawings, a television system 1 comprises a television 2 (TV), a hard disk recorder 3 (HDR), and a satellite dish 4. The HDR 3 comprises a satellite receiver which is connected to the satellite dish 4 for reception of signals from a satellite (not shown). The HDR receives signals from the satellite dish 4, including television signals, in a plurality of channels.

2. Hard Disk Recorder (HDR)—Overview

Figure 2:
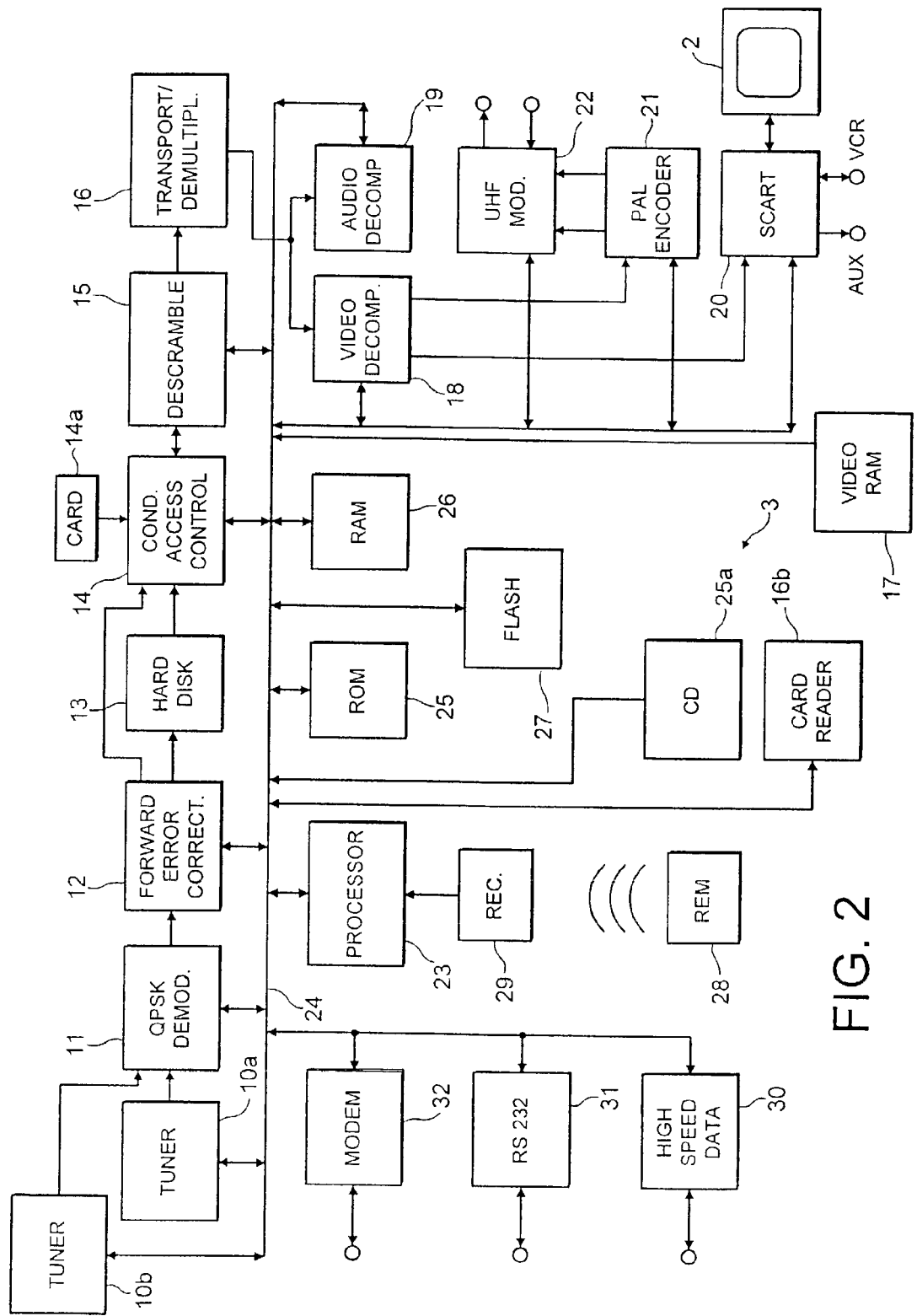
FIG. 2 is a functional block diagram of a Hard Disk Recorder (HDR)

FIG. 2 of the accompanying drawings shows the HDR 3 in greater detail. Signals from the dish antenna 4 (shown in FIG. 1) are input to first and second tuners 10a and 10b and from there to a quadrature phase shift key (QPSK) demodulator 11. The first and second tuners 10a and 10b are tunable into the same or different channels for simultaneous reception of the same or different television programmes. Demodulated signals are error-corrected by way of a forward error corrector circuit 12. The HDR 3 comprises a hard disk 13 which receives from the forward error corrector circuit 12 compressed video and audio data forming television programmes for recording and subsequent playback thereof, as will be described in greater detail hereinbelow. The received signals comprise digitally encoded data. It is envisaged that the data will be compressed using for example the DVB/MPEG 2 standards which permit both programme data and additional data (for example interactive service data) to be transmitted in a single channel. DVB/MPEG 2 enables high compression ratios to be achieved. The hard disk 13 receives and stores compressed data. The data is decompressed only after retrieval from the hard disk 13.

Satellite (and indeed cable) programmes are usually scrambled to prevent unauthorised access by non-authorised subscribers. The HDR 3 therefore comprises a conditional access control circuit 14 which co-operates with a smart card 14a to determine whether the viewer has subscribed to a particular channel and is therefore authorised to access the channel. Parental control over channel access is also provided, at least in part, by the access control circuit 14. The HDR 3 further comprises a descrambling circuit 15 which is controlled by the access control circuit 14 to enable the descrambling of the signal by authorised subscribers.

Descrambled data is supplied to a transport/demultiplexer 16 which separates the data into video data, audio data, user services data, programme scheduling data, etc. for distribution to various locations within the HDR 3. The HDR 3 also comprises a video decompression and processing circuit 18 utilizing a dedicated video RAM 17, and an audio decompression and processing circuit 19, operating according to the MPEG standard, for example. The video and audio decompression and processing circuits 18 and 19 receive demultiplexed signals directly from the transport/demultiplexer 16, or from the hard disk 13. Decompressed video signals are input to a SCART interface 20 for direct input to the TV 2 and to a PAL encoder 21 where they are encoded into the PAL format for modulation by a UHF modulator 22 for output to the UHF input of the TV if so desired.

The HDR 3 is controlled by a processor 23 which communicates with the various units of the system via a bus 24. The processor 23 has associated with it ROM 25 (optionally including a CD-ROM drive 25a), RAM 26 (comprising both dynamic RAM and static RAM) and a flash (non-volatile and writable) memory 27.

The processor 23 controls operation of the HDR 3 by tuning the tuners 10a and 10b to receive signals for the desired channels from the dish antenna 4 by controlling the demultiplexing, descrambling and decompression so that the desired programme and/or interactive service data is displayed on the screen of the TV 2, and by controlling the hard disk 13 to record desired television programmes or to play back previously recorded television programmes. Viewer selection of desired programmes and customer services is controlled by way of a remote control unit 28 which in response to viewer manipulation thereof transmits control signals to a receiver 29 for input to the processor. The remote control unit 28 also allows for the control of the operation of the hard disk 13 to record television programmes, to play back recorded television programmes, to program the recording of television programmes, etc. The remote control unit 28 will be described in greater detail hereinafter.

The HDR 3 further comprises a high-speed data interface 30 and an RS232 interface 31 providing a serial link. The high-speed data interface 30 and the RS 232 interface may be connected to a PC and/or a games console 8 and/or other digital equipment (not shown). The high speed data interface 30 enables the HDR 3 to be connected to other devices (not shown) for example to enable reception of services transmitted via other media such as broadband cable and digital terrestrial broadcast. The HDR 3 further comprises a modem interface 32 for connecting a telephone network.

3. Interaction Between Hardware and Software of the HDR

Figure 3:
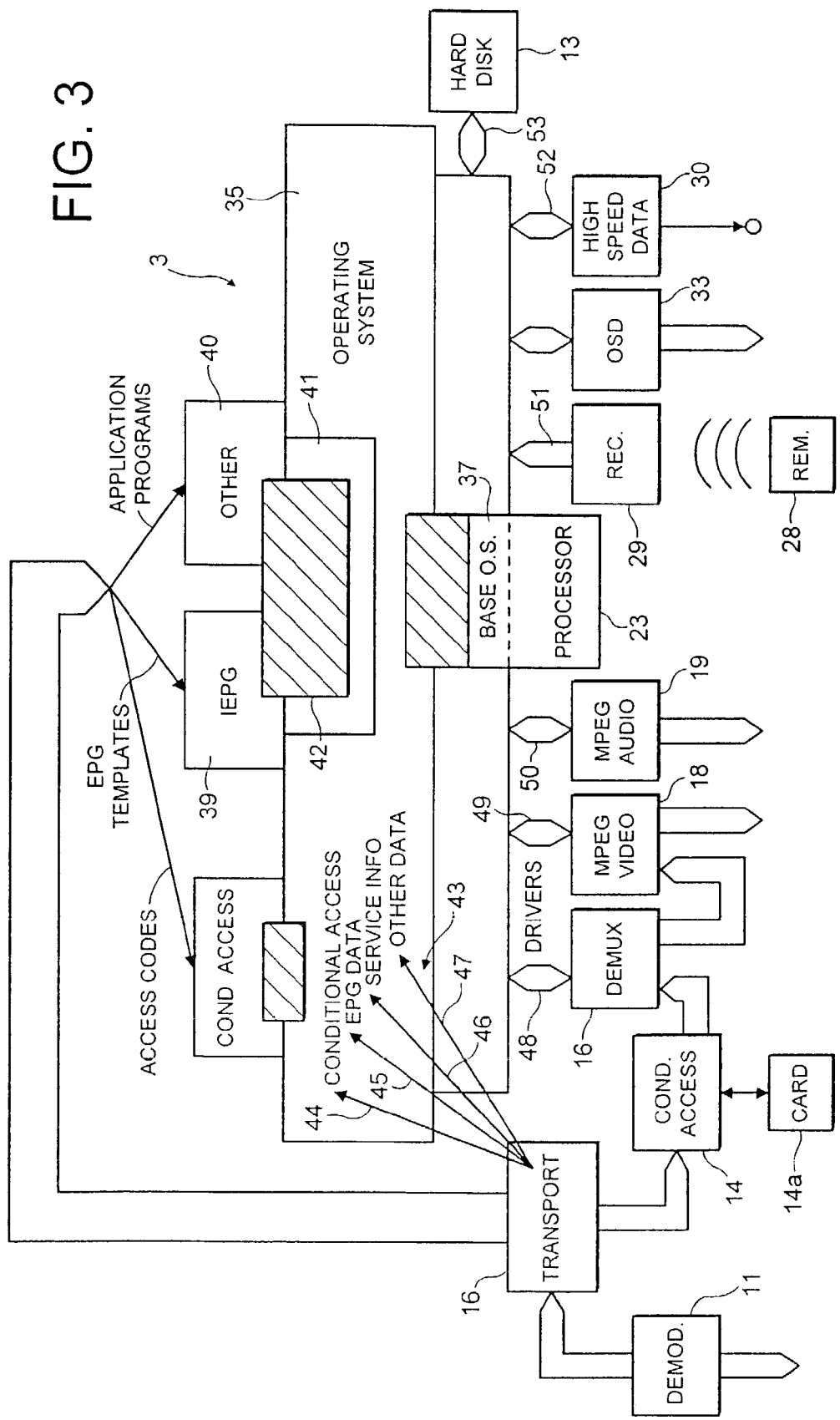
FIG. 3 is a functional diagram showing interaction between hardware and software of the HDR of FIG. 2.

Operation of the HDR 3 is controlled by software that makes the processor 23 responsive to control signals from the remote control unit 28 and to data included in the signal received by the dish antenna 4 and/or stored in the memory units 25 to 27. A schematic representation of the interaction between hardware and software in the HDR 3 is shown in FIG. 3 of the accompanying drawings. The data in an incoming signal is separated by the transport/demultiplexer 16 into video data and information data. The information data is distributed around the hardware and software, as will be described in greater detail hereinafter. The video data and the audio data is demultiplexed and output in suitable form for supply to the TV 2 or to the hard disk 13 by the MPEG video and audio circuits 18 and 19. When information is to be displayed either with or instead of the video data, data representing the information is output in suitable form for supply to the TV via an on-screen display (OSD) driver 33 and the video circuit 18. Signals from the OSD driver 33 and the video circuit 18 are combined as appropriate before being supplied to the TV 2.

Operation of the software and hardware of the HDR 3 is based around an operating system 35. The conditional access controller 14 has associated software 36 which interfaces with the operating system. The processor 23 has its own base operating system 37 which interfaces to the HDR operating system 35. Applications such as an intelligent electronic programme guide (EPG) 39 and other applications 40 including interactive services interface to the operating system 35 via an applications interface 41 and associated application interpreter 42.

The software for conditional access applications such as the IEPG 39 are installed permanently within non-volatile memory, e.g. the ROM 25, of the HDR 3, but variable information such as new access codes and TV programme scheduling details is stored in the RAM 26 and updated regularly via signals received from the dish antenna 4. Demodulated signals from the demodulator 11 are input to the transport/demultiplexer 16 which examines the data to decide where it should be sent. From time to time significant changes may be made to conditional access codes or to the manner in which the EPG 39 displays programme information. Also, programmes for additional applications, say an interactive shopping or banking service for example, are also supplied via the satellite for the HDR 3. Such application data is routed by the transporter/demultiplexer 16 directly to the appropriate areas 40 of the memory 26, 27.

Operating data 43 is supplied on a substantially continuous basis in every channel. The operating data 43 includes conditional access data 44 associated with a channel and/or programmes therein which enables the conditional access controller 14 to determine whether or not access should be allowed to a particular programme by descrambling the data therefor. Additionally, operating data relating to interactive services is transmitted in dedicated interactive service channels which carry control and information data for use by the hardware and software of the processor 23 and the associated memory devices 25 to 27. Thus, the operating data 43 depicted in FIG. 3 also includes interactive service programs and information 46 (for example relating to personal banking services) and indeed any other data 47 required on a substantially continuous or regular basis for the aforementioned interactive services.

The transport/demultiplexer 16 is arranged to supply the operating data 43 to the processor 23. The data is acted upon by the operating system 35, the conditional access and/or other operating software. The processor 23 responds to the data by sending appropriate commands or signals to other units within the system. Control data is also transferred between the processor 23 and such units as the transporter/demultiplexer 16, the hard disk 13, the video and audio decompressors 18, 19, the remote control receiver 29 and the high-speed data interface 30 via respective drivers 48 to 53.

The combined hardware and software of the HDR 3 enables the data in received channels to be decoded for display or recording of viewer selected programmes. The scrambling is controlled on a continuous basis and the HDR can be updated with new descrambling codes as and when required. Data for interactive services is supplied and updated substantially continuously and programmes relating to newly selected interactive services are downloaded into the HDR 3.

Operation of the HDR 3 in receiving and decoding data representing television programmes and data defining scheduling and other information related to the programmes is described in detail in our International (PCT) patent application published as WO 96/37996, aforementioned. Operation of the HDR 3 in providing interactive services is described in our International (PCT) application published as WO 97/23997, aforementioned.

Within the Digital Video Broadcasting (DVB) standards for digital TV transmission there exists a standard for the transmission of schedule information such that it can be decoded and presented correctly to subscribers in the form of an Electronic Programme Guide (EPG).

This DVB standard is known generally as the SI standard and can be found in the specification: ETS 300 468, ETSI Digital Broadcasting Systems for Television, Sound and Data Services; Specification for Service Information (SI) in Digital Video Broadcasting (DVB) Systems 2nd edition. Guidelines for using the specification are given in ETSI ETR 211-DVB SI Guidelines.

In order to allow broadcasters to utilise any proprietary features of their EPGs the SI standard includes methodology for extending the format of the service information (SI) stream by the inclusion of private data tables and descriptors. The HDR 3 is, of course, designed to support the mandatory parts of the SI specification.

4. Remote Control

Figure 4:
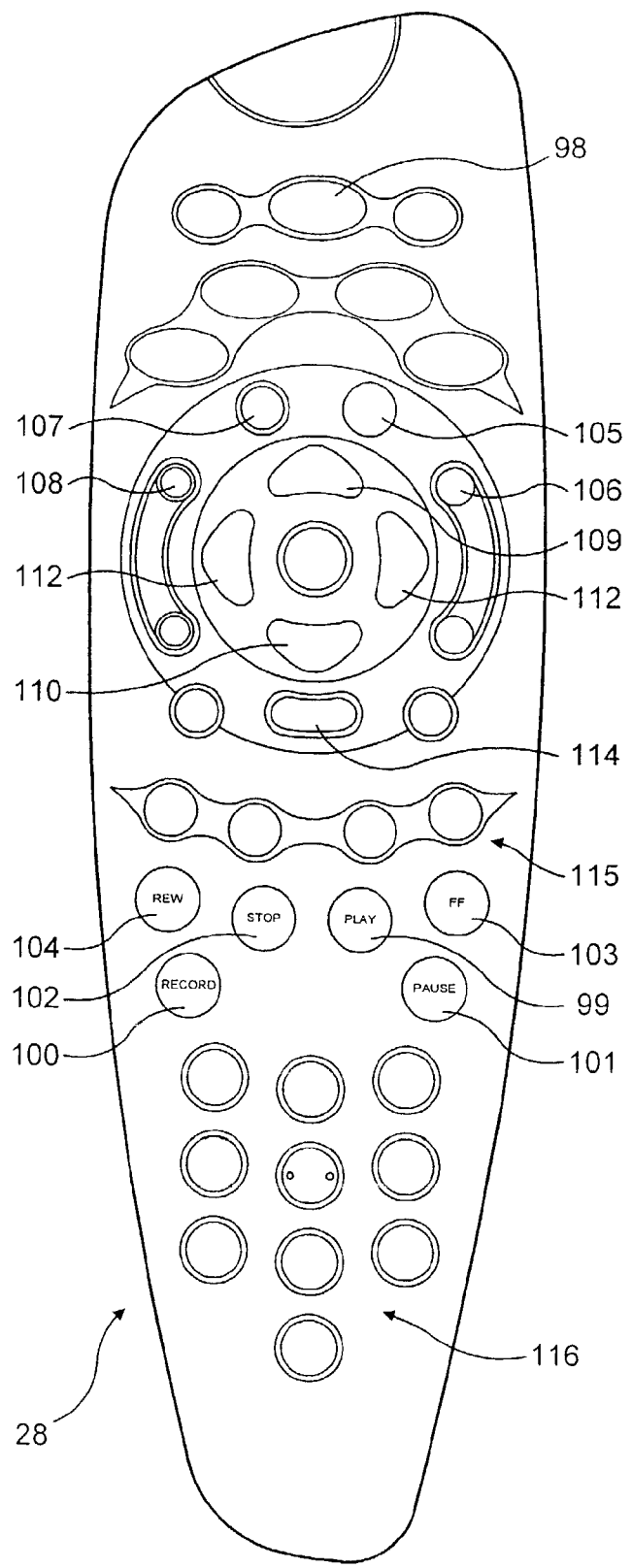
FIG. 4 is a schematic illustration of a remote control which may be used to control the HDR.

FIG. 4 illustrates the remote control 28 for the control of the HDR 3. A manipulation of the keys on the remote control 28 causes the remote control 28 to transmit to the HDR 3 corresponding command signals.

The remote control comprises an on/off key 98, a manipulation of which causes the HDR 3 to be switched on or off. Also, the remote control 28 comprises a playback key 99, a record key 100, a pause key 101, a stop key 102, a fast forward key 103, and a fast rewind key 104. Manipulation of the playback key 99 causes the HDR 3 to playback a recorded television programme from the hard disk 13. Manipulation of the record key 100 causes a television programme to be recorded on the hard disk 13. A manipulation of the pause key 101 causes the HDR 3 to halt a currently played back television programme, as described above, while a manipulation of the stop key 102 causes the playback to be stopped. The fast forward key 103 and the fast rewind key 104 allow a user to operate the HDR 3 in fast forward or fast rewind modes, as will be described in detail hereinafter.

In addition, the remote control 28 comprises a menu key 105, a TV guide key 106, a services key 107, and an interactive services key 108. A manipulation of one of these keys 105 to 108 causes the HDR 3 to display a corresponding menu screen, as discussed above. Furthermore, the remote control 28 comprises an "up" key 109, a "down" key 110, a "right" key 111, and a "left" key 112. Manipulation of these keys allows a user to select displayed menu items. An operation associated with a selected menu item is executed by manipulation of an execute key 113. Alternatively, a selected menu item is marked as selected by manipulation of a select key 114. Similarly, the remote control 28 comprises colour keys 115 of different colours. Manipulation of one of the colour keys 115 allows a user to select a menu item which is indicated on a displayed menu screen to be associated with the colour of the manipulated colour key, as will be described in detail hereinbelow.

Also, the remote control 28 comprises number keys 116 whose manipulation causes the HDR 3 to tune to a channel corresponding to the number entered through the number keys 116.

5. The Hard Disk

Since the first and second tuners 10*a* and 10*b* can be tuned to receive different channels, it is possible for a first television programme in one channel to be displayed on the TV 2, while at the same time a second television programme in another channel is recorded on the hard disk 13. Furthermore, as will be explained below, two different television programmes may be recorded simultaneously on the hard disk 13.

The hard disk 13 of the HDR 3 is similar to hard disks used in computer systems for storing large amounts of data. The hard disk 13 has a capacity of several gigabytes (e.g. 10-20 gigabytes) and receives video and audio data for storage in the compressed form in which it is received, for example, in accordance with the DVB/MPEG 2 standards as discussed above. This allows for the storage of several hours of television programmes (e.g. 10-15 hours) on the hard disk 13. The hard disk 13 comprises two storage areas, one for the storage of television programme data, and the other for storing "metadata" which is used to control the hard disk 13, as will be discussed in greater detail hereinbelow. The operation of the hard disk 13 is controlled by the processor 23. The processor 23 sends control commands to the hard disk 13, to start/stop the recording of a television programme, to play back a recorded television programme, etc.

Figure 5:
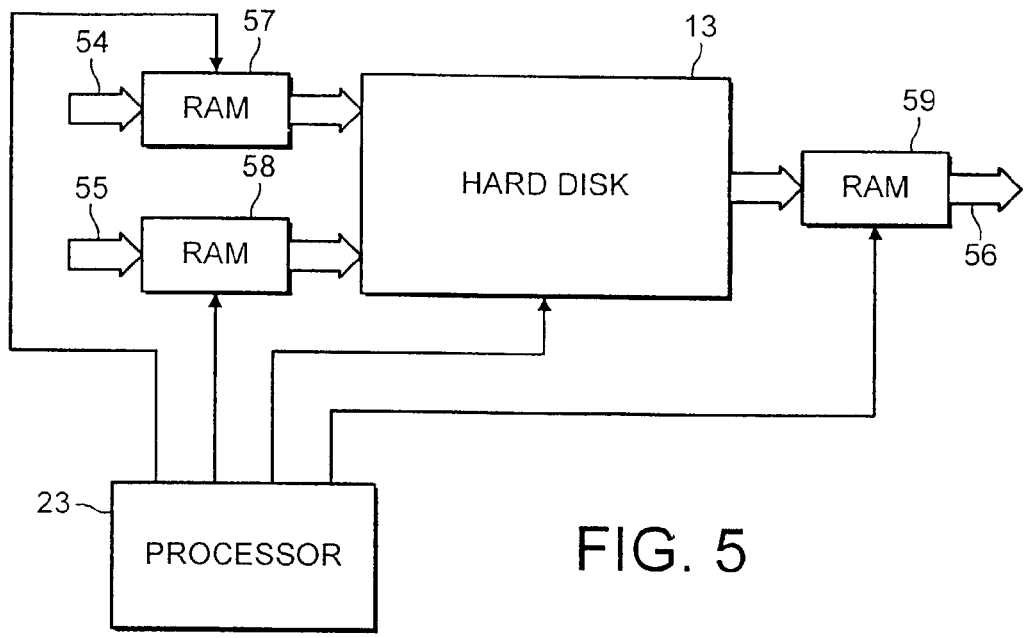
FIG. 5 is a functional block diagram of a hard disk arrangement.

Referring now to FIG. 5 of the accompanying drawings, a schematic block diagram of the arrangement of the hard disk 13 is shown. The hard disk 13 has three data channels through two of which data is received for storage on the hard disk 13 and through one of which it is output for subsequent displaying of television pictures. The three data channels consist of two data input channels 54 and 55 and one data output channel 56. Each of the data channels has associated with it a data buffer 57, 58 and 59, respectively. Each of the data buffers 57, 58 and 59 comprises a RAM of sufficient size to store several seconds of data (e.g. 8 megabytes). The operation of the data buffers 57, 58 and 59 as well as that of the hard disk 13 are controlled by the processor 23.

The hard disk 13 is operable to manage simultaneous reception of data through the data channels 54 and 55 and output of data through the data channel 56. Data received through the data channels 54 and 55 is not stored directly on the hard disk 13 as it is received but is buffered by the buffers 57 and 58, respectively. Likewise, data to be output through the data channel 56 is not output directly as it is read from the hard disk 13 but is buffered in the buffer 59.

The hard disk 13 is capable of managing a data rate which is higher than the rate at which data can be transferred through at least two of the three channels 54, 55 and 56. That is, the hard disk 13 is capable of managing a data rate at least as high as the rate of data transmitted through all three channels 54, 55 and 56 combined. Thereby, the hard disk 13 is capable of simultaneously storing data received through both the input channels 54 and 55 and outputting data through the output channel 56.

This is achieved by buffering the received data and the data to be output in the buffers 57, 58 and 59, and by switching between them in order to transfer data from the input buffers 57 and 58 to the hard disk 13, or to transfer data from the hard disk 13 to the buffer 59. Although hard disks comprising separate heads for writing and reading are available, in the interest of cost the hard disk 13 comprises one single head for both writing onto and reading from the hard disk 13. Therefore, while the hard disk 13 at any point in time stores/reads data associated with only one of the three data channels 54, 55 and 56, it sequentially stores/reads data associated with the three channels 54, 55 and 56, thereby "virtually" dealing with the three data channels simultaneously.

The switching is controlled by the processor 23 by arbitrating between any three of the buffers 57, 58 and 59 at a frequency which is in accordance with their buffer size so as to prevent a data overflow and thereby data loss. For example, if the buffers 57, 58 and 59 are capable of storing 30 seconds of received data each, and the HDR 3 is operated to record two simultaneous television programmes received through the channels 54 and 55, then the hard disk 13 is operated to receive alternately data from the buffers 57 and 58 at an alternation cycle of 30 seconds or less, transferring the buffer content to the hard disk 13 each time the processor switches from one of the buffers 57, 58 to the other. Accordingly, it is possible to record simultaneous/overlapping television programmes received by the first and second tuners 10a, 10b in different channels.

The buffering of incoming as well as outgoing data by the data buffers 57, 58 and 59 means that the hard disk 13 does not need to be synchronised to a particular input or output data rate. Instead, the hard disk 13 always reads and stores data at the same constant data rate. The amount of data stored on or read from the hard disk 13 is determined by the duration for which the hard disk 13 is switched through for data transfer to the respective one of the data buffers 57, 58 or 59. During such time data is transferred from or to the respective data buffer at the constant data rate. While the reception data rate through the channels 54 and 55 or the output data rate through the channel 56 may vary (for example depending on the bandwidth of received television signals, or depending on the playback mode), the rate of data transferred between any of the buffers 57, 58 and 59 and the hard disk 13 is constant and determined by the data rate the hard disk 13 is capable to manage.

The hard disk 13 is controlled by the processor 23 to operate in different playback modes, including forward and backward modes, in which a recorded programme can played back at the normal frame rate or at a reduced frame rate (i.e. slow motion). The hard disk 13 is also operable in a fast forward and a fast rewind mode, in which a recorded television programme can be played back at an increased frame rate. The viewer may select any of these modes by giving appropriate commands via the remote control 28.

5.1 Skipping Undesired Programme Parts

In a skip mode, the processor responds to signals from the remote control 28 by controlling the hard disk 13 to skip forwards and backwards through recorded programmes, to skip back to the beginning of a recorded programme, or to skip forward to the next recorded programme. For this purpose, the beginning of a recorded television programme on the hard disk 13 is marked by storing metadata in the form of an indicator pointing at and thereby marking the beginning of the programme.

The indicator data along with other metadata data used for controlling the hard disk 13 is stored in a metadata area of the hard disk 13. The indicator data is based on the standard time codes which is transmitted with television programme signals.

During playback the viewer may wish to pause a programme part way through while he goes and does something else. When the viewer operates the remote control 28 to give a command to pause the playback, the processor 23 generates an indicator signal and causes the hard disk 13 to store corresponding indicator data in the form of a time code in the metadata area on the hard disk 13. When the viewer wishes to resume the viewing of the programme, an appropriate command via the remote control 28 causes the processor 23 to control the hard disk 13 to read the stored time code and to skip to the corresponding hard disk position to resume playback of the programme from that position. In other words, the HDR 3 "remembers" when the viewing of a recorded television programme was interrupted and resumes the playback of the remaining television programme accordingly.

Programmes may be broadcast which include "skip" signals indicating the start and/or the end of parts of the programmes (for example parts of programmes separated by advertising breaks). These skip signals are time code-based and are transmitted in each channel together with the television signals. When the HDR records a television programme that includes skip signals in the television signals, the HDR 3 causes the hard disk 13 to store skip codes representative of the skip signals as a list of successive skip codes in the metadata area on the hard disk 13. During playback of such a television programme a "skip" mode may be selected (by user manipulation of the remote control) in which the processor 23 responds to the stored skip codes to control how programme signals are read from the hard disk 13. Thus, for example, the skip codes might identify time codes for the start and end of advertising breaks in a programme and the processor 23 may be arranged to respond to the skip codes by controlling the hard disk 13 to output television signals for the programme until the frame corresponding to the start time code is reached and then to continue outputting signals from the frame corresponding to the end time code. In this way advertising breaks may be skipped during playback of a recorded programme.

5.2 Halting a Television Programme and Catching-Up Again

The HDR 3 is operable to display a television programme which is currently being received through one of the tuners 10a, 10b in two different playback modes. In the first display mode, the television programme is displayed "directly" without being recorded on the hard disk 13. In the second playback mode, the currently received television programme is recorded on the hard disk 13 and the recorded television programme is played back from the hard disk 13. The resulting time shift between the played back television programme and the television programme as it is recorded is marginal and is not perceptible by a viewer.

Starting from either of these playback modes, the hard disk 13 is operable to simulate the halting of a currently displayed television programme and to resume playback of the programme any time after the moment at which it was halted. If the user wishes to halt the current television programme while the HDR 3 is in the first playback mode, he may do so, for example, by manipulating the pause button on the remote control 28. The processor 23 is arranged to respond to a "pause" signal from the remote control 28 by controlling the hard disk 13 to start recording the current television programme. In the second playback mode, the hard disk 13 simply carries on recording.

When "pause" is selected, the processor 23 "freezes" the current television picture frame by causing the same frame to be repeatedly output to the TV 2. When the user wishes to resume watching the television programme, he may do so by again manipulating the pause button on the remote control 28. The processor 23 responds to this second pause signal by causing the hard disk 13 to output the recorded data for the halted television programme from the moment at which the user first manipulated the pause button.

The hard disk 13 continues recording the television programme as it is received by one of the tuners 10a or 10b. In other words, the hard disk 13 can simultaneously record a concurrently received television programme and play back the television programme offset in time by the period for which the television programme was halted. (The manner in which the hard disk records and plays back simultaneously is described above in connection with FIG. 5.)

The strong emotional pull of a broadcast live event, for example a live sports event, makes it desirable to be able to catch up with the actual live broadcast after it has been halted. One possibility of catching up is, of course, to switch from playing back the recorded programme shifted in time to displaying the programme as it is received by one of the tuners 10a or 10b (and simultaneously recorded by the hard disk 13 in the second playback mode), thereby ignoring the period during which the displaying of the television programme was halted.

Another possibility is to catch up by skipping advertising breaks or any other parts of the television programme in which the viewer is not interested. As discussed above, the HDR 3 is arranged to receive broadcast signals that indicate the start and/or end of advertising breaks or predetermined parts of the television programme (such as the half-time break of a football match), and to store corresponding data pointing at the start and/or the end of such programme parts on the hard disk 13 together with the data representing the television programme. On receipt of an appropriate command from the remote control 28, the processor 23 reads this data from the hard disk 13, and in response thereto jumps to the next point of the recorded television programme, for example to the end of an advertisement break. If there is more than one advertisement break inside the period in which the live broadcast was halted, then this operation can be repeated by the user by giving the same command during any advertisement break or any other undesired part of the television programme that can be skipped in this manner.

The HDR 3 is also able to catch-up dynamically. To this end during playback the recorded television programme is played back at an increased speed relative to the "live" speed. For example, if a broadcast was halted for one minute, and the television programme recorded during that one minute was replayed from the hard disk 13 at 125% of its normal (live) speed, then the time offset caused by the halt would be overcome in four minutes. The playback speed is increased by retrieving data from the hard disk 13 at an increased rate and by "dropping" frames of the television picture to be displayed during playback. The rate of data retrieval is increased by transferring more data from the hard disk 13 to the data buffer 59 (see FIG. 5), e.g. by switching the hard disk 13 to the buffer 59 more frequently and/or for longer periods of time (see the discussion of FIG. 5 hereinabove). The catching-up rate, i.e. the playback speed can be selected by the viewer via the remote control 28. This dynamic catching-up can be combined with the above described skipping of advertisement breaks or other undesired parts of television programmes, thus allowing the viewer to catch-up even more quickly.

When the catching-up is finished, in the first playback mode, the HDR 3 switches from outputting television signals from the hard disk 13 to outputting television signals as received by one of the tuners 10a or 10b. In the second playback mode, the HDR 3 operates the hard disk 13 to switch to normal playback speed.

5.3 Substituting Broadcast Advertisements

The HDR 3 also is operable to play back pre-recorded advertisements from the hard disk 13 instead of advertisements received from the broadcaster. This feature is of interest when the HDR 3 is to be used in public premises, for example in pubs or sports bars during the transmission of sports events. In this latter example, it may be desirable to show, say, beer advertisements which may tempt the addressed customer immediately to purchase a specific brand of beer.

The HDR 3 is arranged to receive signals transmitted by the broadcaster indicating the start and the end of advertisement breaks. On receipt of a signal by the HDR 3 indicating the start of an advertisement break, the processor 23 causes the hard disk 13 to replay a pre-recorded advertisement sequence which is displayed on the TV 2 instead of the television programme as received by one of the tuners 10a or 10b. Once the HDR 3 receives another signal indicating the end of the advertisement break, the processor 23 causes the hard disk 13 to terminate the playback of the pre-recorded advertisement sequence, such that the television programme as received by one of the tuners 10a or 10b is displayed again on the TV 2.

Furthermore, the HDR 3 is arranged to use the signals indicating the start and the end of advertisement breaks not to record advertisement breaks during the recording of a selected television programme. In this case, during the recording of a programme, the processor 23 controls the hard disk 13 to halt the recording on receipt of a signal indicating the start of an advertisement break. Subsequently, on receipt of a signal indicating the end of an advertisement break, the processor 23 controls the hard disk 13 to resume the recording.

Instead of using one signal each for indicating the start and the end of an advertisement break, the HDR 3 may be arranged to process to the same effect signals indicating the start and the duration of an advertisement break. In this alternative embodiment, the processor 23 switches back to the television programme as received, or operates the hard disk 13 to resume the recording, at the end of the indicated duration of the advertisement break. Accordingly, no separate signals to indicate the end of advertisement breaks are required.

5.4 Programme Scheduling Information

The data in each channel is in compressed form, for example in accordance with the DVB/MPEG-2 standard as discussed hereinabove. DVB allows both video data and other data to be combined in a single channel. In addition to the aforementioned operating data 43 (see FIG. 3) for use in controlling access to channels, the data in a channel can include brief programme scheduling data representative of so-called event information tables (EITs) defining the scheduling of programmes in each channel as scheduling events. The programme schedule data is used by the HDR 3 to control the operation of the hard disk 13. When the HDR 3 is pre-programmed to record a selected television programme, the HDR 3 operates the hard disk 13 to start and to stop the recording in accordance with the scheduling data which comprises the start and the end time of the selected television programme. Since the scheduling data is updated regularly, the recording is started and stopped in accordance with the updated programme schedule, thus guaranteeing that a selected programme is actually recorded even in case of a change of programme schedule, because such change is reflected in the programme schedule data in each channel.

The scheduling data may be stored in the RAM 26 and, once stored, the scheduling information is available effectively instantaneously for controlling the operation of the hard disk 13. As discussed above, the scheduling data is transmitted regularly (say every 30 seconds) so that the HDR 3 will be updated substantially continuously. The information is brief to enable each channel to carry the scheduling data without excessive overheads in terms of bandwidth requirements in each channel and memory requirements in the HDR.

In addition, it is envisaged that a dedicated IEPG channel will transmit more detailed programme scheduling information. The information transmitted via this dedicated channel is updated more frequently (say every 3 seconds) and cover a longer period of time (e.g. one week). As a consequence, an up-to-date television programme schedule of a complete week will always be available. As will be explained in greater detail below, the HDR 3 is arranged to display the programme scheduling information on the TV 2. Also, a viewer can interact with the HDR 3 to program recordings of television programmes, view a desired part of the available programme schedule, etc., on the basis of the information received via the dedicated IEPG channel.

Accordingly, while the programme scheduling data in each channel is used by the HDR 3 to operate the hard disk 13 to record a pre-programmed television programme in a selected channel at the correct up-to-date time, the programme scheduling data in the dedicated IEPG channel is used to display the programme schedule for several of the channels over a predetermined period of time (which in turn is used for programming the HDR 3 as will be described hereinbelow).

6. Operation of the HDR

The programme schedule information represented by the digital signals in the IEPG channel received via the satellite dish 4 can be displayed under viewer control via the remote control 28 on the TV 2. Selection of the menu key 105 causes the HDR 3 to output for display a main menu screen. (Similarly, selecting the TV guide key 106, the services key 107 or the interactive service key 108 will cause the HDR 3 to select an appropriate control menu screen for display to enable viewer interaction in respect of those services as described in our aforementioned international application WO97/23997).

Figure 6:
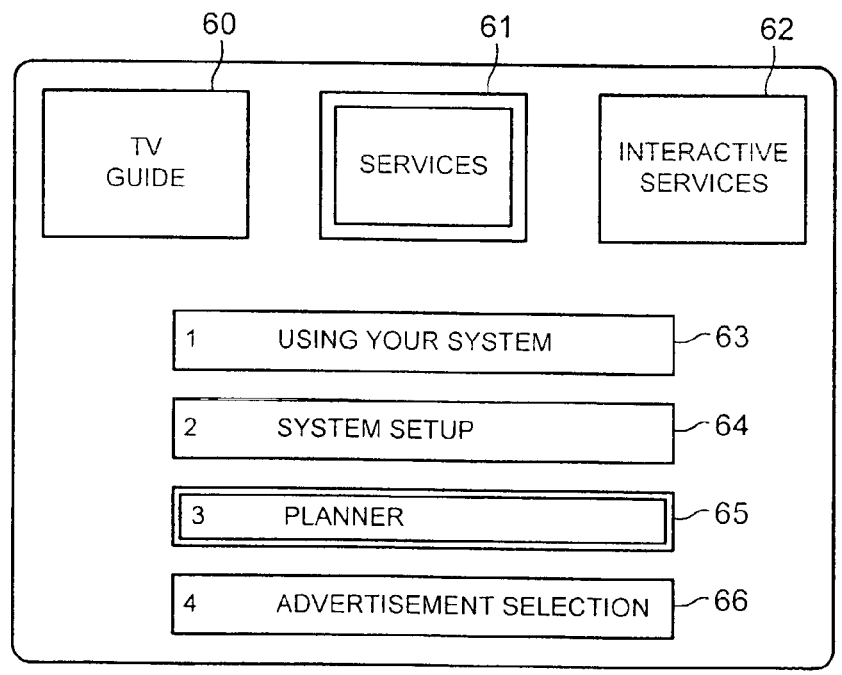
FIG. 6 is a schematic representation of a "services" screen.

A schematic representation of the services menu screen is shown in FIG. 6. On top of the screen, menu items 60, 61 and 62 represent the available control menus, of which item 61—corresponding to the currently displayed control menu—is highlighted. One of the other two control menus can be selected and displayed by pressing the TV guide key 106 or the interactive service key 108 on the remote control 28, or by pressing the "left" or the "right" key 111/117, selection of which causes menu item 60 or 62 to be highlighted, respectively.

Similarly, menu items 63, 64, 65 and 66 of the services control menu can be selected by using the "down" or the "up" key 109/110 on the remote control 28, causing the currently selected menu item 65 to be highlighted, followed by pressing the "execute" key 113.

6.1 Display of TV Programme Schedule

Figure 7:
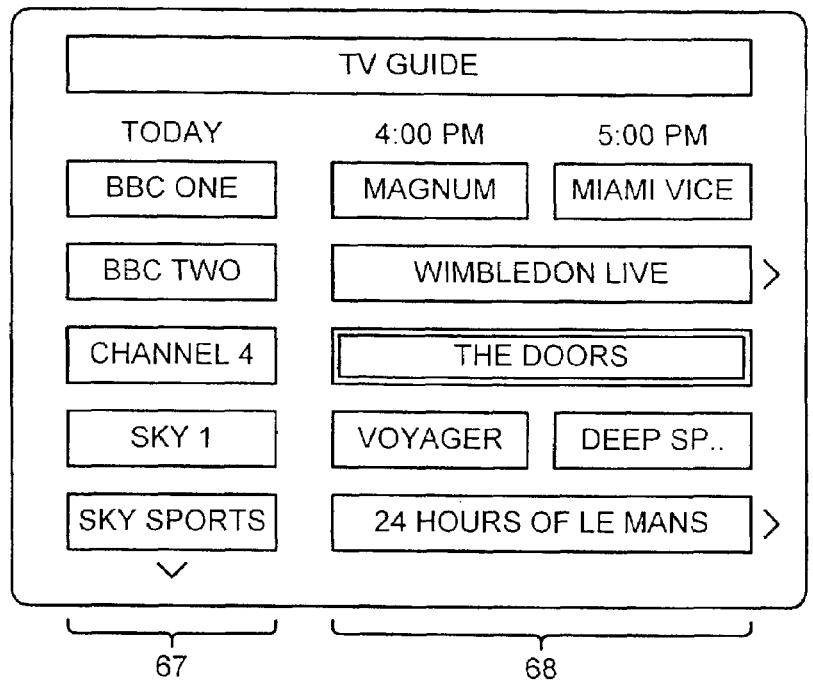
FIG. 7 is a schematic representation of a "TV guide" screen.

FIG. 7 shows in simplified form a TV programme schedule screen which is displayed on the TV screen after selection of the "TV guide" item 60 in FIG. 5. Signals representing the TV programme schedule are received by the HDR 3 via the satellite dish 4 in a dedicated EPG channel, as described above. The left-hand side column 67 in FIG. 7 lists the available channels, while the right-hand side column 68 lists the television programmes for each channel in chronological order. If not all available channels can be displayed on the screen, the viewer can cause the HDR 3 to display them by operating the "up" or "down" key 109/110 on the remote control 28, thereby causing the HDR 3 to make the screen to scroll up or down, respectively. Also, if the viewer wishes to move backward or forward in time to display earlier or subsequent television programmes, he can do so by operating the "left" or the "right" key 111/112 on the remote control 28, respectively.

Likewise, the viewer may select one of the displayed television programmes by using the "up", "down", "left" and "right" keys 109-112 on the remote control. The currently selected programme "The Doors" is highlighted. If the viewer wished to select "Voyager" instead, he would have to operate the "down" key 110. If he wished to select "Deep Space Nine", he would have to operate the "down" key 110 followed by the "right" key 111.

6.2 Planner

If a selection of a programme is followed by an operation of the "record" key 100, then data representative of the selected programme is stored in the RAM 26. The selection of a programme and the resulting storage of data representative of the selected programme causes the HDR 3 to record on the hard disk 13 the selected programme at the time when it is scheduled to be broadcast. As discussed above, the hard disk 13 is operated to record the selected programme in accordance with the programme schedule data in the selected channel.

The data stored in the RAM 26 in response to a programme selection represents information concerning the title of the selected programme, its start and end times, as well as status information as to whether a selected programme is still to be recorded, whether it has been recorded or part-recorded and is still to be viewed, or whether a recorded programme has been partially viewed. All this information is displayable on the TV screen by sending an appropriate command to the HDR 3 via the remote control 28 which causes the HDR 3 to retrieve the corresponding data from the RAM 26 to display the information it represents. The displayed information will be referred to hereinafter as the "planner" because it allows a user to plan his personal television schedule by making appropriate selections.

The planner information is stored on the hard disk 13 in form of data representing a list of successive programmes over time. The processor 23 operates the hard disk 13 to record a television programme at the time stored in association with the first television programme to be recorded in this list. In response thereto, the status information associated with this programme is updated to indicate that the programme has been recorded. The processor operates the hard disk 13 again at the time associated with the next programme in the list to be recorded, and so on.

A planner screen is illustrated schematically in FIG. 6. When the planner screen is selected to be displayed on the TV 2, for example by a selection of the menu item 65 in FIG. 5, the processor 28 retrieves the data representing the planner information from the RAM 26 and causes the HDR 3 to display a planner screen as shown in of FIG. 8.

Referring back to FIG. 7, the movie "The Doors" is highlighted to indicate a user selection. Upon operation of the "execute" key 113 on the remote control 28, information associated with "The Doors" is stored in the RAM 26, namely the date on which the "The Doors" is scheduled to be broadcast, the channel on which it is broadcast "Channel 4", the start and end time of the broadcast, as well as the name of the programme ("The Doors"). Manipulation of the appropriate key on the remote control 28 causes the HDR 3 to display the planner screen of FIG. 8. The names of the television programmes in the planner (reference numeral 71) are displayed together with the names of channels (reference numeral 72). In addition, status information (reference numeral 73) is displayed, indicative of whether a programme is stored on the hard disk 13 and has been viewed ("Trainspotting"), whether a programme has been partially viewed ("Get Carter"), whether a stored programme is yet to be viewed ("Friends"), or whether a programme is yet to be recorded on the hard disk 13 ("The Doors" and "Silverstone Grand Prix"). Signals representative of such status information are generated automatically by the processor 28, and the data representative thereof is stored in the memory RAM 26 on selection of a programme. The data in the RAM 26 is updated by the processor 28 once a status change has occurred, e.g. when a recorded and previously unviewed programme has been viewed.

Figure 8:
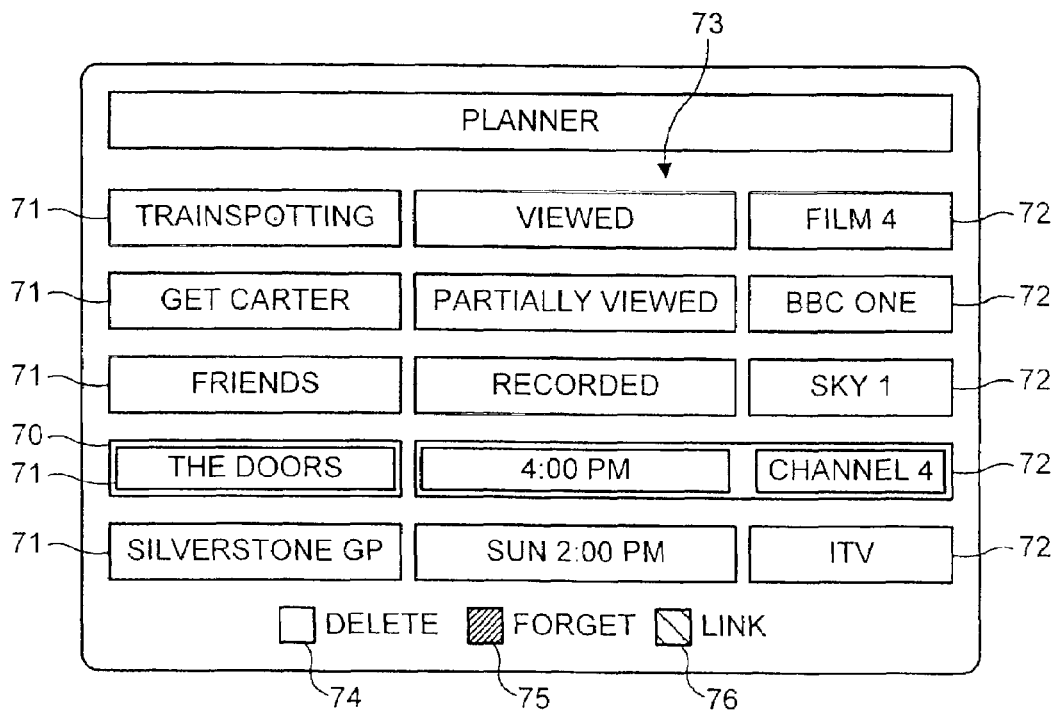
FIG. 8 is a schematic representation of a "planner" screen.

The planner screen of FIG. 8 can be used to control several of the functions of the HDR 3. For instance, a recorded programme can be replayed from the hard disk 13 by selecting the desired programme using the "up" and "down" keys 109, 110 and then by operating the "playback" key 99 on the remote control 28. In case of a partially-viewed programme (such as "Get Carter"), the viewer may resume viewing such programme by giving the same commands (selection followed by manipulation of the "playback" key 99). The processor 23 then operates the hard disk 13 to jump to the point where the viewing was interrupted and resumes the playback (by operation of the HDR 3 as described above in greater detail).

Also, any of the programmes listed in the planner screen as recorded on the hard disk 13 (such as "Friends") can be deleted from the hard disk 13 by selecting the same and then operating a "delete" key on the remote control 28. Such "delete" key in this embodiment is a colour key whose colour is indicated in box 74 in FIG. 8. Also, a programme listed in the planner as to be recorded (such as "The Doors" or "Silverstone Grand Prix") can be deleted by selecting the programme followed by operating another colour key on the remote control 28 corresponding to the colour indicated by box 75.

The planner screen as shown in FIG. 8 furthermore allows for the execution of a "link" command by selecting one of the listed programmes followed by manipulating the colour key on the remote control corresponding to the colour shown in box 76. The link command allows for programmes related to the one selected to be included into the planner programme list for recording.

A programme may be related in some way to other programmes to be transmitted at different times and/or on different channels by the same TV service company. Obviously, programmes in daily or weekly serials are related to each other. Other relationships are less obvious. For example, a TV service company may wish to run a season of James Bond movies over a number of different channels with each movie being shown one or more times. Broadcasting in the digital domain makes it possible to include in the data for the showings of each movie, together with further data linking that movie to other movies in the season. The processor 23 is arranged to respond to such linking data by displaying prompts when the viewer selects one movie by executing the link command. The prompts alert the viewer to other movies in the season and ask the viewer whether he/she wishes any of the other movies to be included in the planner for recording.

Alternatively, the HDR 3 may be arranged to make such selection automatically without prompting the user to confirm the selection. In this case, the automatically selected programmes may simply be included in the planner. Alternatively, they may be listed in a separate screen similar to the planner screen of FIG. 8.

7. System Set-Up

Figure 9:
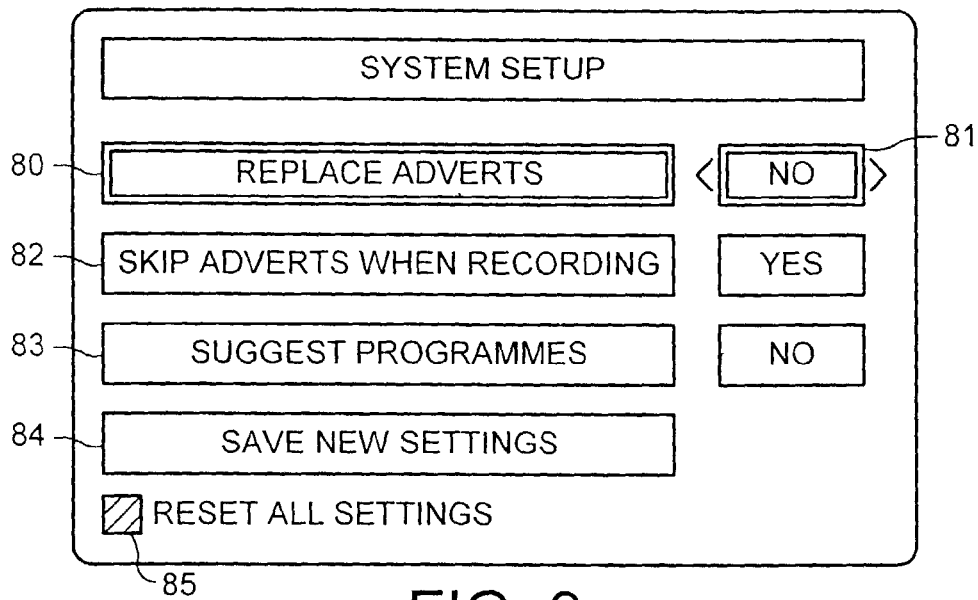
FIG. 9 is a schematic representation of a "system setup" screen.

FIG. 9 shows a system set-up screen as displayed when the system set-up item 64 of FIG. 6 is selected. In this embodiment, three set-up parameters are listed. A first parameter 80 is shown as highlighted and allows for a selection of whether or not advertisements received from the broadcaster are substituted with pre-recorded advertisements, as described above. A selection is performed by highlighting the parameter 80 by using the "up" and "down" keys 109, 110, and by manipulating the "left" and "right" keys 111, 112 on the remote control 28 which causes a menu item 81 associated with the parameter 80 to switch between the settings "yes" and "no". Similarly, parameter 82 allows for a selection of whether or not advertisements not to be recorded during recording of a programme, as described above. A parameter 83 enables the user to activate or deactivate an automatic selection for recording of programmes linked to a programme previously selected by the user, as described above. The thus selected parameters are saved in the RAM 26 by selecting the parameter 84 and manipulating the "execute" key 113 on the remote control 28. The settings may be reset by manipulating the colour key on the remote control 28 which corresponds to the colour displayed in the box 85.

8. Advertisement Selection

Figure 10:
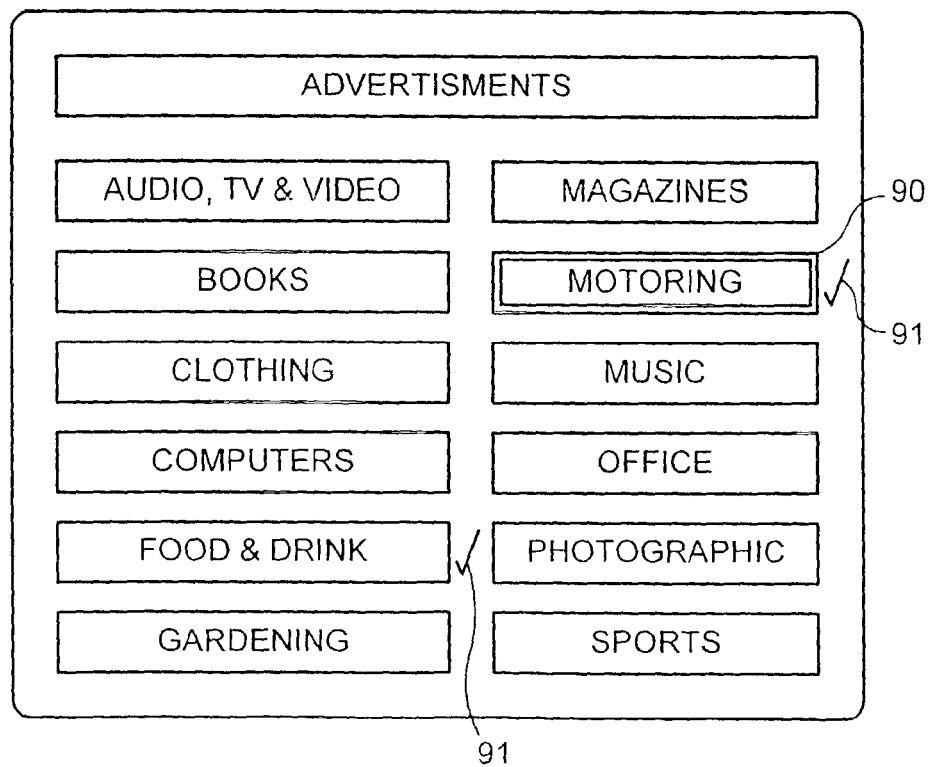
FIG. 10 is a schematic representation of an "advertisements" screen.

When the "adverts" icon 66 of FIG. 6 is selected, an advertisement selection screen is displayed as shown in FIG. 10 of the accompanying drawings. The advertisement selection screen allows for selection of the category of advertisements which will be played back from the hard disk 13 if the "replace adverts" setting (parameter 80 in FIG. 9) is activated (see above). The selection of the desired advertisement category is performed by manipulating the "up", "down", "right" and "left" keys 109-112 on the remote control 28 to highlight a desired category. In the advertisement selection screen in FIG. 10, the category "Motoring" is highlighted (indicated by box 90). The highlighted category can then be activated, for example, by manipulating the "execute" key 113 on the remote control 28. An activated category is marked by a tick 91. More than one category can be activated at the same time. In the example of FIG. 10, the categories "food & drink" and "motoring" are activated.

It should be noted that the present invention is not limited to the embodiment as described above. It is envisaged that various modifications and variations to the above described embodiment can be made without falling outside the scope of the present invention as determined from the claims.

The invention claimed is:

1. A receiver for receiving signals representative of television programmes in a plurality of channels, the receiver comprising:
    a first tuner for receiving signals in a first channel;
    a first data buffer for buffering data representative of signals received by the first tuner;
    a second tuner for simultaneously receiving signals in a second channel;
    a second data buffer for buffering data representative of signals received by the second tuner;
    a recorder for recording data representative of signals in the first and the second channel received simultaneously by the first tuner and the second tuner;
    a third data buffer for buffering data from the recorder representative of television pictures to be displayed on a television screen; and
    a processor for selectively causing data to be transferred from the first data buffer or the second data buffer to the recorder for recording the transferred data and to transfer data from the recorder to the third data buffer;
    wherein the first data buffer is arranged to receive signals from the first tuner representative of data at a first data rate, the second data buffer is arranged to receive signals from the second tuner representative of data at a second data rate, and the rate at which data is transferred selectively from the first data buffer or the second data buffer to the recorder is equal to or higher than the first and second data rates combined;
    whereby the recorder is operable successively to record data buffered in the first and the second data buffer, and to transfer data from the recorder to the third data buffer, the successively stored and transferred data being representative of signals simultaneously received by the first and the second tuners and output from the third data buffer, respectively.

2. The receiver of claim 1, wherein the third data buffer is arranged to output signals representative of data at a third data rate, and the rate at which data is transferred selectively from the recorder to the third buffer is equal to or higher than the first, second and third data rates combined.

3. The receiver of claim 2, wherein the rate at which data is transferred selectively from the first data buffer or the second data buffer to the recorder is equal to or higher than the first, second and third data rates combined.

4. The receiver of claim 1, wherein the recorder comprises a hard disk.

5. The receiver of claim 1, wherein the recorder comprises an optical storage medium.

* * * * *